(12) United States Patent
Ishihara

(10) Patent No.: US 12,316,100 B2
(45) Date of Patent: May 27, 2025

(54) ON-BOARD CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Akio Ishihara, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 28 days.

(21) Appl. No.: 18/264,477

(22) PCT Filed: Jan. 20, 2022

(86) PCT No.: PCT/JP2022/001878
§ 371 (c)(1),
(2) Date: Aug. 7, 2023

(87) PCT Pub. No.: WO2022/172713
PCT Pub. Date: Aug. 18, 2022

(65) Prior Publication Data
US 2024/0106229 A1   Mar. 28, 2024

(30) Foreign Application Priority Data
Feb. 10, 2021   (JP) .................... 2021-019692

(51) Int. Cl.
*B60R 16/03* (2006.01)
*H02H 7/22* (2006.01)

(52) U.S. Cl.
CPC ............ *H02H 7/22* (2013.01); *B60R 16/03* (2013.01)

(58) Field of Classification Search
CPC . H02H 7/22; H02H 7/268; H02H 3/16; B60R 16/03; B60R 16/02
(Continued)

(56) References Cited

U.S. PATENT DOCUMENTS

| | | | |
|---|---|---|---|
| 5,818,673 A | 10/1998 | Matsumaru et al. | |
| 2016/0202305 A1 | 7/2016 | Umeno | |
| 2020/0216002 A1* | 7/2020 | Mazaki | H02J 7/1423 |

FOREIGN PATENT DOCUMENTS

| | | | |
|---|---|---|---|
| JP | H09189736 A | * | 1/1996 |
| JP | H9-189736 A | | 7/1997 |
| JP | H11-48881 A | | 2/1999 |

OTHER PUBLICATIONS

International Search Report, Application No. PCT/JP2022/001878, mailed Apr. 5, 2022. ISA/Japan Patent Office.

* cited by examiner

*Primary Examiner* — Elim Ortiz
(74) *Attorney, Agent, or Firm* — Honigman LLP

(57) ABSTRACT

An on-board control device includes a plurality of relays, a control unit, and a plurality of current detection units. The plurality of current detection units detect the value of current that flows through respective branch paths. The relays switch between an allowance state of allowing current flow on the respective branch paths and a shut off state of shutting off the current flow. If an anomalous state determined in advance is detected, the control unit switches the relay provided on a specific branch path on which the current value is increasing at the fastest rate among the plurality of branch paths to the shut off state, based on the detection results of the current detection units.

6 Claims, 2 Drawing Sheets

(58) Field of Classification Search
USPC ......... 307/10.1, 131, 31; 320/162; 361/93.1, 361/42, 62
See application file for complete search history.

ON-BOARD CONTROL DEVICE

CROSS-REFERENCE TO RELATED APPLICATIONS

This application is the U.S. national stage of PCT/JP2022/001878 filed on Jan. 20, 2022, which claims priority of Japanese Patent Application No. JP 2021-019692 filed on Feb. 10, 2021, the contents of which are incorporated herein.

TECHNICAL FIELD

The present disclosure relates to an on-board control device.

BACKGROUND

JP 9-189736A discloses an automotive power supply device. This automotive power supply device uses a main power distribution device to distribute power from a main power source to plural pieces of electrical equipment. A site-specific power distribution device is provided between the main power distribution device and each piece of electrical equipment. Each of the site-specific power distribution devices is connected to the main power distribution device via a main power distribution line equipped with a fuse. When a large current flows through the main power distribution line due to the occurrence of an anomalous state such as a ground fault, for example, the fuse blows and the main power distribution line is thus disconnected.

If an anomalous state occurs on any of branch paths that branch out from the main power distribution device and are connected to respective pieces of electrical equipment, it is desirable to immediately isolate that branch path so as to not affect the branch paths on which an anomalous state has not occurred. However, there is concern that, in the case where isolation is realized by blowing a fuse, it takes time for the fuse to blow.

In view of this, an object of the present disclosure is to provide a technology capable of immediately isolating a branch path on which an anomalous state is highly likely to have occurred.

SUMMARY

An on-board control device of the present disclosure is an on-board control device for application to an on-board system including a power source unit, a power path through which power is supplied from the power source unit, and a plurality of branch paths branching out from the power path. The on-board control device includes a plurality of relays, a control unit configured to control the plurality of relays, and a current detection unit configured to detect a value of current flowing through each of the branch paths, wherein the relays each switch between an allowance state of allowing current flow on the respective branch path and a shut off state of shutting off the current flow, and if a predetermined anomalous state is detected, the control unit switches the relay provided on a specific branch path on which a current value is increasing at a fastest rate among the plurality of branch paths to the shut off state, based on detection results of the current detection unit.

Advantageous Effects

According to the present disclosure, a branch path on which an anomalous state is highly likely to have occurred can be immediately isolated.

DETAILED DESCRIPTION OF PREFERRED EMBODIMENTS

Figure 1:
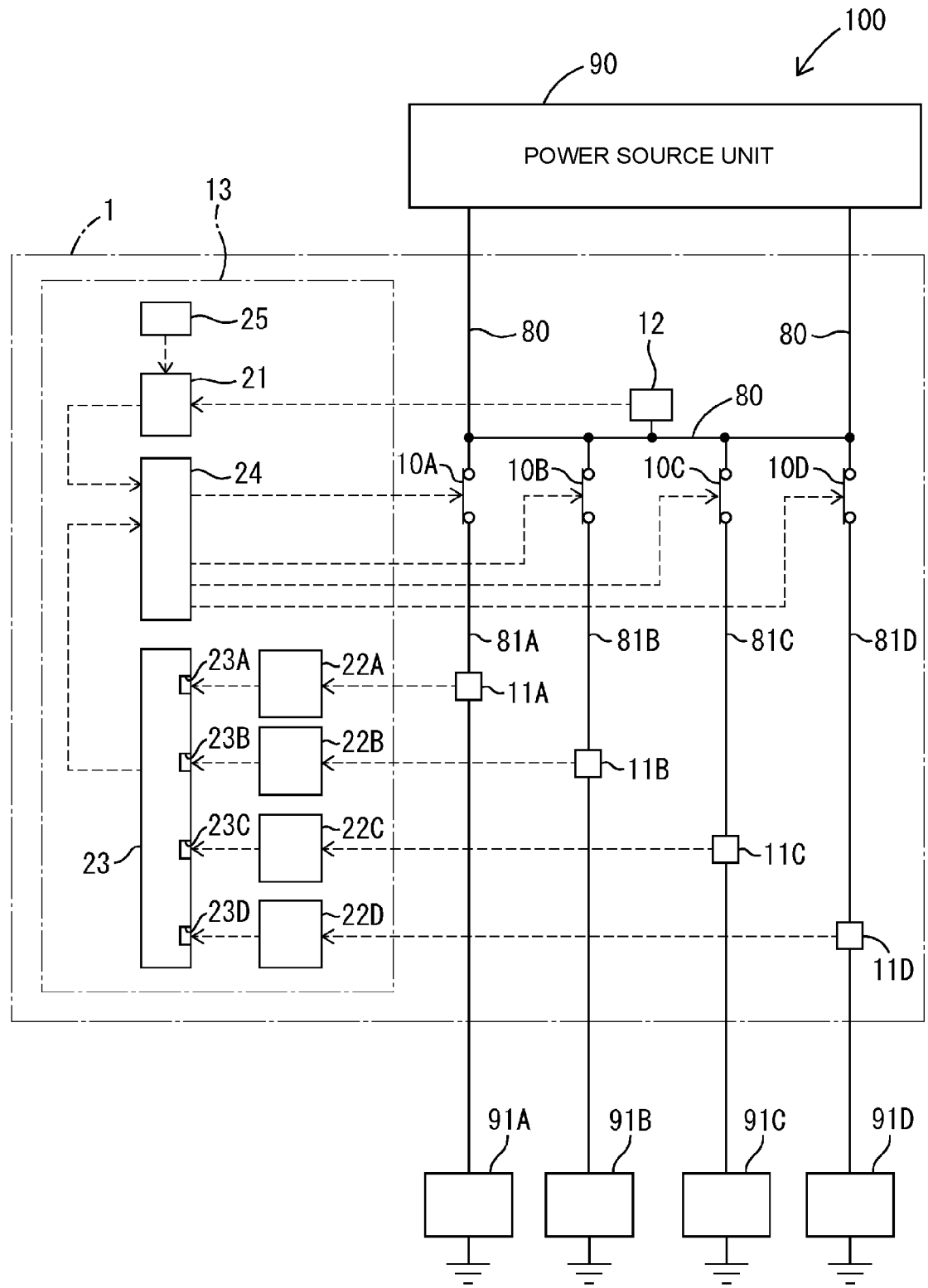
FIG. 1 is a circuit diagram schematically showing the configuration of an on-board system to which an on-board control device of a first embodiment is applied.

Hereinafter, embodiments of the present disclosure will be enumerated and illustrated.

An on-board control device for application to an on-board system including a power source unit, a power path through which power is supplied from the power source unit, and a plurality of branch paths branching out from the power path, the on-board control device including a plurality of relays, a control unit configured to control the plurality of relays, and a current detection unit configured to detect a value of current flowing through each of the branch paths, the relays each switching between an allowance state of allowing current flow on the respective branch path and a shut off state of shutting off the current flow, and, if a predetermined anomalous state is detected, the control unit switching the relay provided on a specific branch path on which a current value is increasing at a fastest rate among the plurality of branch paths to the shut off state, based on detection results of the current detection unit.

If an anomalous state is detected, this on-board control device is able to shut off the flow of current to the specific branch path on which the current value is increasing at the fastest rate. Accordingly, the specific branch path on which the current is highly likely to have increased sharply can be immediately isolated from the other branch paths.

The on-board control device according to [1] including a voltage detection unit configured to detect a voltage of the power path or the branch paths, and, if the voltage detected by the voltage detection unit decreases to a threshold voltage or lower, the control unit switches the relay provided on the specific branch path to the shut off state.

According to this configuration, if a ground fault occurs on any of the branch paths, the branch path on which the ground fault is highly likely to have occurred can be immediately isolated from the other branch paths.

The on-board control device according to [2], in which the voltage detection unit detects the voltage of the power path.

According to this configuration, even in the case where any of the branch paths is disconnected, the voltages of the branch paths that are not disconnected can be detected.

The on-board control device according to any one of [1] to [3], in which the control unit takes the branch path with respect to which a value obtained by time differentiating the current value is largest as the specific branch path, and switches the relay provided on the specific branch path to the shut off state.

According to this configuration, the specific branch path on which the current value is increasing at the fastest rate can be specified by comparing values obtained by time differentiating the current values, and the relay provided on the specific branch path can be switched to the shut off state.

The on-board control device according to [4], in which the control unit includes a determination circuit configured to output an anomaly signal if the anomalous state occurs, a differential circuit configured to time differentiate the current value of each of the branch paths detected by the current detection unit, a selection circuit configured to output a selection signal indicating the branch path with respect to which a largest differential value is obtained among differential values obtained by time differentiating the respective current values, based on calculation results of the differential circuit, and a shut-off circuit configured to switch the relay provided on the branch path indicated by the selection signal to the shut off state, if input of the anomaly signal is received.

According to this configuration, the processing up to specifying the specific branch path and switching a relay to the shut off state is simplified, thus enabling the relay provided on the specific branch path to be switched to the shut off state more quickly when an anomalous state occurs.

The on-board control device according to any one of [1] to [5], in which the control unit determines a threshold for determining the anomalous state, based on a situation of power supply from the power source unit.

According to this configuration, a threshold for determining the anomalous state is determined by the situation of power supply from the power source unit, thus enabling erroneous determination of the anomalous state to be suppressed.

First Embodiment

An on-board system 100 shown in FIG. 1 is a system that is installed in a vehicle. The on-board system 100 includes a power source unit 90, a plurality of loads 91A, 91B, 91C and 91D, a power path 80, a plurality of branch paths 81A, 81B, 81C and 81D, and an on-board control device 1.

The power source unit 90 is a battery such as a lead battery, for example, a DCDC converter, an alternator, or the like. The power source unit 90 is electrically connected to the power path 80. Power that is based on the power source unit 90 is supplied to the power path 80.

The power path 80 and the branch paths 81A, 81B, 81C and 81D are constituted by electrical wires and have an inductance component. The power path 80 is a path through which power is supplied from the power source unit 90. The power source unit 90 is electrically connected to the power path 80. The branch paths 81A, 81B, 81C and 81D are paths that branch out from the power path 80. The branch paths 81A, 81B, 81C and 81D are electrically connected to the respective loads 91A, 91B, 91C and 91D.

The loads 91A, 91B, 91C and 91D are low voltage loads, for example, and are, specifically, an electric power steering system, an electric parking brake, lights, a wiper drive unit, a navigation device, a sensing system such as a millimeter wave radar or a stereo camera, and a system for automatic driving such as a speed control system or an inter-vehicle control system. The branch paths 81A, 81B, 81C and 81D are electrically connected to the respective loads 91A, 91B, 91C and 91D.

The on-board control device 1 is a device that is applied to the on-board system 100. The on-board control device 1 is provided with a plurality of relays 10A, 10B, 10C and 10D, a plurality of current detection units 11A, 11B, 11C and 11D, and a control unit 13.

The relays 10A, 10B, 10C and 10D are provided on the respective branch paths 81A, 81B, 81C and 81D. The relays 10A, 10B, 10C and 10D switch between an allowance state of allowing current flow on the respective branch paths 81A, 81B, 81C and 81D and a shut off state of shutting off the current flow. The relays 10A, 10B, 10C and 10D may be semiconductor relays such as MOSFETs or may be mechanical relays. The relays 10A, 10B, 10C and 10D are in the allowance state when ON and are in the shut off state when OFF. The shut off state need only be a state in which at least current flow on the load 91A, 91B, 91C and 91D side from the power source unit 90 side is shut off. In the present embodiment, the shut off state is a state in which bidirectional current flow is shut off, that is, a state in which current flow on the load 91A, 91B, 91C and 91D side from the power source unit 90 side is shut off, and current flow on the power source unit 90 side from the load 91A, 91B, 91C and 91D side is shut off.

The current detection units 11A, 11B, 11C and 11D are known current detection circuits, for example, and are provided on the branch paths 81A, 81B, 81C and 81D. The current detection units 11A, 11B, 11C and 11D are provided on the load 91A, 91B, 91C and 91D side with respect to the relays 10A, 10B, 10C and 10D. The current detection units 11A, 11B, 11C and 11D are configured by, for example, shunt resistors provided on the respective branch paths 81A, 81B, 81C and 81D and differential amplifiers that amplify and output the end-to-end voltages of the shunt resistors. The current detection units 11A, 11B, 11C and 11D detect the value of current flowing through the corresponding branch paths 81A, 81B, 81C and 81D, and output current value signals indicating the values of the detected currents. The current value signals are input to the control unit 13.

A voltage detection unit 12 is a known voltage detection circuit, for example, and has a function of detecting the voltage of the power path 80. The voltage detection unit 12, in the present embodiment, detects the voltage of the power path 80 by detecting the voltage at a position electrically connected to the power path 80, but may detect the voltage of the power path 80 itself. The voltage detection unit 12 outputs a voltage value signal indicating the voltage value of the power path 80 (e.g., signal indicating voltage value of power path 80, value obtained by dividing voltage value of power path 80 with voltage divider circuit, etc.). The voltage value signal is input to the control unit 13.

The control unit 13 is configured to include a microcomputer, and has a CPU, ROM, RAM and the like. The current value signals and the voltage value signal are input to the control unit 13. The control unit 13 can control the operations of the relays 10A, 10B, 10C and 10D.

If an anomalous state determined in advance is detected, the control unit 13 switches the relay provided on the specific branch path on which the current value is increasing at the fastest rate among the plurality of branch paths 81A, 81B, 81C and 81D to the shut off state, based on the detection results of the current detection units 11A, 11B, 11C and 11D. The "anomalous state" is, for example, "a state in which the voltage value or current value of the power path 80 or any of the branch paths 81A, 81B, 81C and 81D has reached a predetermined level". More specifically, the "anomalous state" is "a state in which the voltage detected by the voltage detection unit 12 has decreased to a threshold voltage or lower". In other words, when the voltage detected by the voltage detection unit 12 decreases to the threshold voltage or lower, the control unit 13 switches the relay provided on the specific branch path to the shut off state. More specifically, the control unit 13 takes the branch path with respect to which a value obtained by time differentiating the current value is largest as the specific branch path, and switches the relay provided on the specific branch path to the shut off state.

The threshold voltage is greater than 0 V. In the case where the power source unit 90 is a battery, for example, the threshold voltage is a value smaller than the output voltage when the battery is fully charged, and, in the case where the power source unit 90 is a DCDC converter, the threshold voltage is a value smaller than a target voltage of the DCDC converter.

The control unit 13 can determine a threshold (in the present embodiment, threshold voltage) for determining an anomalous state, based on the situation of power supply from the power source unit 90. The "situation of power supply from the power source unit 90" includes, for example, whether or not the vehicle is traveling, the amount of power supplied from the power source unit 90, the value of current flowing on the load 91A, 91B, 91C and 91D side from the power source unit 90, the number of loads that are supplied with power from the power source unit 90, the types of loads that are supplied with power from the power source unit 90, and whether a start switch is ON or OFF. For example, the control unit 13 determines a relatively large threshold voltage in the case where the vehicle is traveling, and determines a relatively small threshold voltage in the case where the vehicle is not traveling. Whether or not the vehicle is traveling is determined based on vehicle speed, for example. The determination of whether or not the vehicle is traveling may be performed by the control unit 13 or by an external ECU. Also, as another example, the control unit 13 may determine a large threshold voltage in the case where the power supply amount from the power source unit 90 is relatively large, and determine a small threshold voltage in the case where the power supply amount is relatively small. As a specific determination method, a function whose variables are the power supply amount and the threshold voltage, for example, may be stored in advance, and the threshold voltage may be determined based on this function and the power supply amount. Alternatively, a table in which power supply amounts are associated with threshold voltages may be stored in advance, and the threshold voltage may be determined based on this table and the power supply amount. Note that the power supply amount may be calculated by the control unit 13 or by an external ECU.

The control unit 13 includes a determination circuit 21, a plurality of differential circuits 22A, 22B, 22C and 22D, a selection circuit 23, a shut-off circuit 24, and a threshold determination circuit 25. The determination circuit 21 is a circuit that outputs an anomaly signal if an anomalous state occurs. The voltage value signal is input to the determination circuit 21. The determination circuit 21 determines whether or not an anomalous state has occurred, based on the voltage value signal. Specifically, the determination circuit 21 determines that an anomalous state has not occurred if the voltage detected by the voltage detection unit 12 is greater than the threshold voltage, and determines that an anomalous state has occurred if the voltage detected by the voltage detection unit 12 has decreased to the threshold voltage or lower.

The differential circuits 22A, 22B, 22C and 22D are circuits that time differentiate the current values detected by the current detection units 11A, 11B, 11C and 11D of the respective branch paths 81A, 81B, 81C and 81D. The current value signals output by the current detection units 11A, 11B, 11C and 11D are input to the respective differential circuits 22A, 22B, 22C and 22D. The differential circuits 22A, 22B, 22C and 22D time differentiate the current values detected by the respective current detection units 11A, 11B, 11C and 11D, based on the input current value signals. The differential circuits 22A, 22B, 22C and 22D each output a calculation result.

The selection circuit 23 is a circuit that outputs a selection signal indicating the branch path with respect to which the largest differential value is obtained among the differential values that are obtained by time differentiating the respective current values, based on the calculation results of the differential circuits 22A, 22B, 22C and 22D. The calculation results of the differential circuits 22A, 22B, 22C and 22D are input to the selection circuit 23. The selection circuit 23 has a plurality of input terminals 23A, 23B, 23C and 23D. The calculation results of the differential circuits 22A, 22B, 22C and 22D are input to the respective input terminals 23A, 23B, 23C and 23D. The selection circuit 23 specifies the branch path with respect to which the largest differential value is obtained, based on the input calculation results, and outputs a selection signal indicating the specified branch path. The selection circuit 23 continues outputting the selection signal indicating the branch path 81A. If the branch path with respect to which the largest differential value is obtained changes, the selection circuit 23 switches to a selection signal indicating the branch path specified after the change.

The shut-off circuit 24 is a circuit that switches the relay provided on the branch path indicated by the selection signal to the shut off state, if input of an anomaly signal is received. The anomaly signal and the selection signal are input to the shut-off circuit 24. The anomaly signal is input to the shut-off circuit 24 from the determination circuit 21 if an anomalous state occurs. The selection signal is continuously input to the shut-off circuit 24 by the selection circuit 23. The shut-off circuit 24 switches the relay provided on the branch path indicated by the selection signal to the shut off state, based on the selection signal that being input when input of the anomaly signal is received.

The threshold determination circuit 25 is a circuit that determines the threshold (in the present embodiment, threshold voltage) for determining an anomalous state, based on the situation of power supply from the power source unit 90. The threshold determination circuit 25 outputs the determined threshold voltage. The determination circuit 21 described above determines whether or not an anomalous state has occurred, based on the threshold voltage determined by the threshold determination circuit 25.

The following description relates to the operations of the control unit 13.

In the example shown in FIG. 1, the relays 10A, 10B, 10C and 10D are all in the allowance state. Power from the power source unit 90 is supplied to the loads 91A, 91B, 91C and 91D. The voltage that is detected by the voltage detection unit 12 is a larger value than the threshold voltage. Thus, the determination circuit 21 does not output an anomaly signal due to not detecting an anomalous state. Accordingly, the shut-off circuit 24 does not switch any of the relays 10A, 10B, 10C and 10D to the shut off state.

Figure 2:
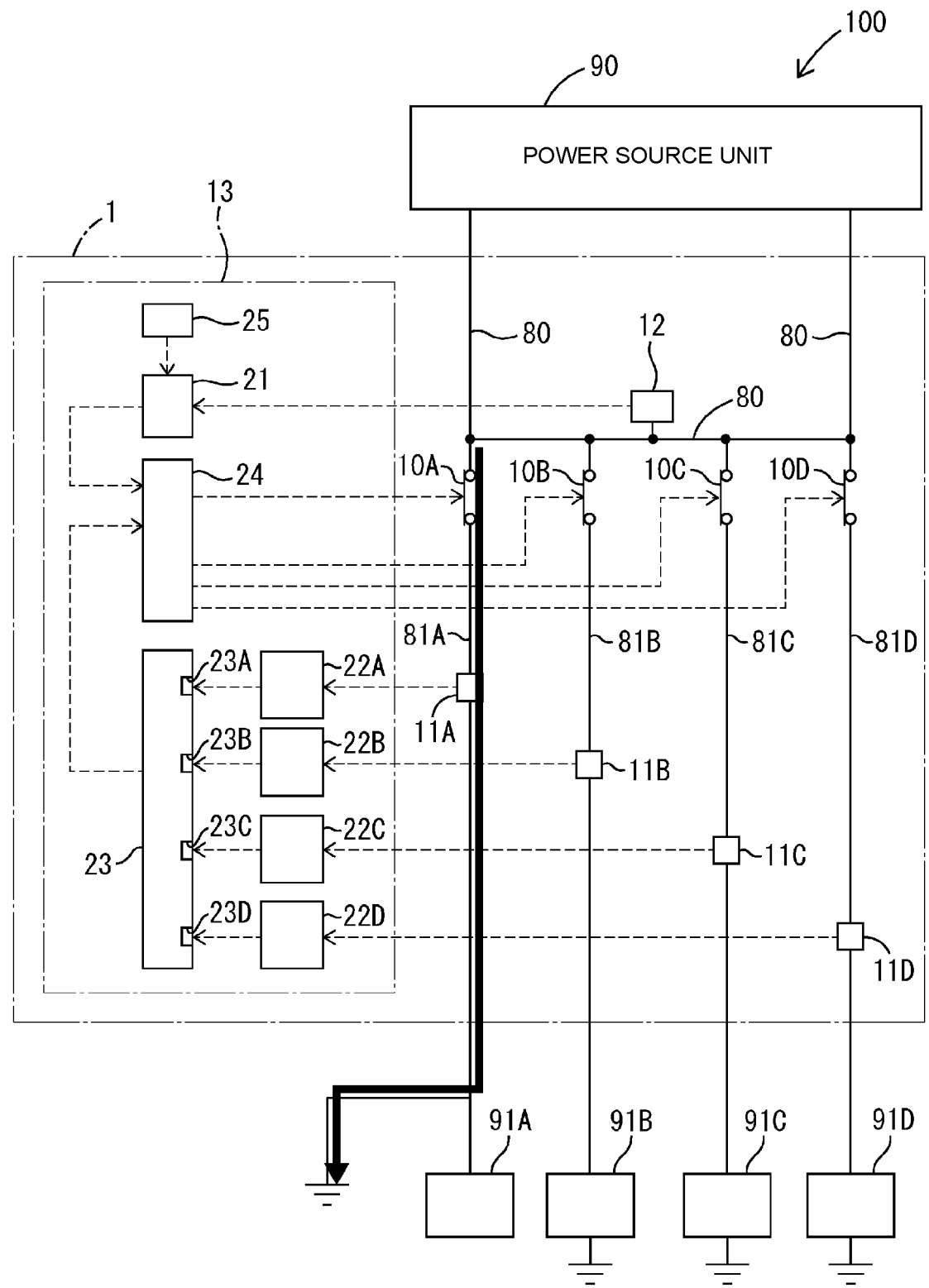
FIG. 2 is an illustrative diagram conceptually showing the on-board system when an anomalous state has occurred.

Thereafter, when an anomaly such as a ground fault occurs on the branch path 81A, as shown in FIG. 2, the voltages of the power path 80 and the branch paths 81A, 81B, 81C and 81D decrease. As a result, an anomaly signal is input to the shut-off circuit 24 by the determination circuit 21 when the determination circuit 21 detects the anomalous state.

On the other hand, the values of the currents flowing through the power path 80 and the branch paths 81A, 81B, 81C and 81D increase. Since the power path 80 and the branch paths 81A, 81B, 81C and 81D have an inductance component, the current value tends to increase at a faster rate as the distance to the position where the anomaly occurred decreases, and tends to increase at a slower rate as the distance to the position where the anomaly occurred increases. Accordingly, it is considered to be highly likely that the anomaly occurred on the specific branch path on which the current value is increasing at the fastest rate. In other words, it is considered to be highly likely that the anomaly occurred on the branch path with respect to which the largest differential value is obtained among the differential values obtained by time differentiating the respective current values.

The differential circuits 22A, 22B, 22C and 22D time differentiate the current values detected by the respective current detection units 11A, 11B, 11C and 11D, based on the input current value signals, and output the calculation results. Since the anomaly occurred on the branch path 81A, the value obtained by time differentiating the current value of the branch path 81A, or, in other words, the calculation result (differential value) of the differential circuit 22A will be the largest. Thus, the selection circuit 23 specifies the branch path 81A as the branch path with respect to which the largest differential value is obtained, based on the calculation results input from the differential circuits 22A, 22B, 22C and 22D. The selection circuit 23 then outputs a selection signal indicating the branch path 81A. When the anomaly signal and the selection signal indicating the branch path 81A are input, the shut-off circuit 24 switches the relay 10A provided on the branch path 81A to the shut off state. The branch path 81A on which the anomaly occurred can thereby be immediately isolated from the power path 80 and the other branch paths 81B, 81C and 81D.

The following description relates to the effects of the first embodiment.

The on-board control device 1 of the first embodiment is a device that is applied to the on-board system 100. The on-board system includes the power source unit 90, the power path 80 that is a path through which power is supplied from the power source unit 90, and the plurality of branch paths 81A, 81B, 81C and 81D that are paths branching out from the power path 80. The on-board control device 1 includes the plurality of relays 10A, 10B, 10C and 10D, the control unit 13, and the plurality of current detection units 11A, 11B, 11C and 11D. The control unit 13 controls the plurality of relays 10A, 10B, 10C and 10D. The plurality of current detection units 11A, 11B, 11C and 11D detect the values of the currents that flow through the respective branch paths 81A, 81B, 81C and 81D. The relays 10A, 10B, 10C and 10D switch between the allowance state of allowing current flow on the respective branch paths 81A, 81B, 81C and 81D and the shut off state of shutting off the current flow. If an anomalous state determined in advance is detected, the control unit 13 switches the relay 10A, 10B, 10C or 10D provided on the specific branch path on which the current value is increasing at the fastest rate among the plurality of branch paths 81A, 81B, 81C and 81D to the shut off state, based on the detection results of the current detection units 11A, 11B, 11C and 11D.

According to this configuration, if an anomalous state is detected, the flow of current on the specific branch path on which the current value is increasing at the fastest rate can be shut off. Accordingly, the specific branch path (branch path 81A in the example shown in FIG. 2) on which the current is highly likely to have increased sharply can be immediately isolated from the other branch paths.

Furthermore, the on-board control device 1 includes the voltage detection unit 12 that detects the voltage of the power path 80 or the branch paths 81A, 81B, 81C and 81D. If the voltage that is detected by the voltage detection unit 12 decreases to a threshold voltage or lower, the control unit 13 switches the relay 10A, 10B, 10C or 10D provided on the specific branch path to the shut off state.

According to this configuration, if a ground fault occurs on any of the branch paths, the branch path on which the ground fault is highly likely to have occurred can be immediately isolated from the other branch paths.

Furthermore, the voltage detection unit 12 detects the voltage of the power path 80.

According to this configuration, even in the case where any of the branch paths is disconnected, the voltages of the branch paths that are not disconnected can be detected.

Furthermore, the control unit 13 takes the branch path with respect to which the value obtained by time differentiating the current value is largest as the specific branch path, and switches the relay 10A, 10B, 10C or 10D provided on the specific branch path to the shut off state.

According to this configuration, the specific branch path on which the current value is increasing at the fastest rate can be specified by comparing the values obtained by time differentiating the current values, and the relay provided on the specific branch path can be switched to the shut off state.

Furthermore, the control unit 13 includes the determination circuit 21, the plurality of differential circuits 22A, 22B, 22C and 22D, the selection circuit 23, and the shut-off circuit 24. The determination circuit 21 outputs an anomaly signal if an anomalous state occurs. The differential circuits 22A, 22B, 22C and 22D time differentiate the current values detected by the current detection units 11A, 11B, 11C and 11D of the respective branch paths 81A, 81B, 81C and 81D. The selection circuit 23 outputs a selection signal indicating the branch path 81A, 81B, 81C or 81D with respect to which the largest differential value is obtained among the differential values obtained by time differentiating the respective current values, based on the calculation results of the differentiation circuits 22A, 22B, 22C and 22D. If input of an anomaly signal is received, the shut-off circuit 24 switches the relay provided on the branch path indicated by the selection signal to the shut off state.

According to this configuration, the processing up to specifying the specific branch path and switching a relay to the shut off state is simplified, thus enabling the relay provided on the specific branch path to be switched to the shut off state more quickly when an anomalous state occurs.

Furthermore, the control unit 13 determines the threshold for determining an anomalous state, based on the situation of power supply from the power source unit 90.

According to this configuration, the threshold for determining the anomalous state is determined by the situation of power supply from the power source unit 90, thus enabling erroneous determination of the anomalous state to be suppressed.

OTHER EMBODIMENTS

The present disclosure is not limited to the embodiment illustrated in the above description and drawings. For example, it is possible to combine the features of the above or following embodiments in any way as long as no inconsistencies arise. Any of the aforementioned features of the above or following embodiments that are not expressly stated as essential can also be omitted. Furthermore, the aforementioned embodiment may be modified as follows.

In the first embodiment, the voltage detection unit is configured to detect the voltage of the power path, but the voltage detection unit may be configured to detect the voltages of the branch paths.

In the first embodiment, the "anomalous state" (state in which the voltage value or current value of the power path or any of the branch paths has reached a predetermined level) is "a state in which the voltage detected by the voltage detection unit has decreased to a threshold voltage or lower", but the "anomalous state" may be a different state. For example, the "anomalous state" may be "a state in which the value of the current detected by any of the plurality of current detection units has increased to a threshold current or higher". Alternatively, the "anomalous state" may be "a state in which the rate of increase (differential value) of the current value of any of the plurality of branch paths has increased to a predetermined rate or faster".

In the first embodiment, the "rate of increase of the current value" was specified by the value obtained by time differentiating the current value, but may be specified by another method. For example, "the rate of increase of the current value" may be specified by the difference (amount of change) of the current value in unit time.

In the first embodiment, the control unit determines the threshold, but the threshold may be a fixed value determined in advance. In this case, the on-board control device need not include a threshold determination circuit.

A current detection unit for detecting the value of current flowing through the power path may be provided if necessary.

Note that the embodiments disclosed herein are to be considered in all respects as illustrative and not restrictive. The scope of the present disclosure is not limited to the embodiment disclosed herein, and all changes that come within the scope defined by the claims or the range of equivalency of the claims are intended to be embraced therein.

The invention claimed is:

1. An on-board control device for application to an on-board system including a power source unit, a power path through which power is supplied from the power source unit, and a plurality of branch paths branching out from the power path, the on-board control device comprising: a plurality of relays, each of the plurality of relays disposed on a corresponding one of the plurality of branch paths; a control unit configured to control the plurality of relays; and a plurality of current detection units, each of the plurality of current detection units disposed on a corresponding one of the plurality of branch paths and configured to detect a value of current flowing through each of the branch paths, the plurality of relays interposed between the power source unit and the plurality of current detection units, wherein the relays each switch between an allowance state of allowing current flow on the respective branch path and a shut off state of shutting off the current flow, when a predetermined anomalous state is detected, the control unit switches the relay provided on a specific branch path on which a current value is increasing at a fastest rate among the plurality of branch paths to the shut off state, based on detection results of the current detection unit, the control unit, furthermore, takes the branch path with respect to which a value obtained by time differentiating the current value is largest as the specific branch path, and switches the relay provided on the specific branch path to the shut off state, and the control unit, furthermore, includes: a determination circuit configured to output an anomaly signal when the anomalous state occurs; a differential circuit configured to time differentiate the current value of each of the branch paths detected by the current detection unit; a selection circuit configured to output a selection signal indicating the branch path with respect to which a largest differential value is obtained among differential values obtained by time differentiating the respective current values, based on calculation results of the differential circuit; and a shut-off circuit configured to switch the relay provided on the branch path indicated by the selection signal to the shut off state, when input of the anomaly signal is received.

2. The on-board control device according to claim 1, including,
a voltage detection unit configured to detect a voltage of the power path or the branch paths,
wherein, when the voltage detected by the voltage detection unit decreases to a threshold voltage or lower, the control unit switches the relay provided on the specific branch path to the shut off state.

3. The on-board control device according to claim 2, wherein the voltage detection unit detects the voltage of the power path.

4. The on-board control device according to claim 1, wherein the control unit determines a threshold for determining the anomalous state, based on a situation of power supply from the power source unit.

5. The on-board control device according to claim 2, wherein the control unit determines a threshold for determining the anomalous state, based on a situation of power supply from the power source unit.

6. The on-board control device according to claim 3, wherein the control unit determines a threshold for determining the anomalous state, based on a situation of power supply from the power source unit.

* * * * *